United States Patent [19]
Brown et al.

[11] 4,191,917
[45] Mar. 4, 1980

[54] BATTERY PACK RECHARGEABLE IN RECESSED OR FLUSH-TYPE RECEPTACLES

[75] Inventors: Wayne R. Brown; John E. Jones; Charles F. Sherrill, all of Danville, Va.

[73] Assignee: Disston, Inc., Pittsburgh, Pa.

[21] Appl. No.: 876,934

[22] Filed: Feb. 10, 1978

Related U.S. Application Data

[63] Continuation-in-part of Ser. No. 827,694, Aug. 25, 1977, abandoned.

[51] Int. Cl.² ................................. H02J 7/00
[52] U.S. Cl. ..................... 320/2; 307/150; 339/32 R; 429/7
[58] Field of Search ............. 320/2; 339/31 R, 31 M, 339/32 R; 429/7, 9, 100; 307/150

[56] References Cited
U.S. PATENT DOCUMENTS

| | | | |
|---|---|---|---|
| 3,013,198 | 12/1961 | Witte et al. | 320/2 |
| 3,027,507 | 3/1962 | Hubner | 320/2 |
| 3,067,373 | 12/1962 | Hopt et al. | 320/2 |
| 3,194,689 | 7/1965 | Deschamps | 320/2 X |
| 4,084,123 | 4/1978 | Lineback et al. | 320/2 |

*Primary Examiner*—Robert J. Hickey
*Attorney, Agent, or Firm*—B. B. Olive

[57] ABSTRACT

A relatively flat, rectangular, box-shaped, rechargeable, battery pack has a multi-positionable plug with prongs. The plug can be appropriately positioned for recharging the pack by insertion of the plug into either a European-type, deeply recessed receptacle, in a shallow recessed receptacle or in a flush, non-recessed United States-type receptacle. The pack is adapted to interchangeably fit into a pocket or any one of a plurality of pockets in a device in which the pack is to be employed. The prongs on the plug furnish voltage to the device when the pack is in a device pocket and furnish voltage to the pack during recharging. In a discharge mode, the plug is depressed and latched within the battery pack leaving only the prongs external of the battery pack for insertion into the device to be powered. The plug is likewise depressed for recharging in a flush-type receptacle. The pack discharge circuitry is actuated by a mating post in the housing of the device to be powered.

8 Claims, 27 Drawing Figures

BATTERY PACK RECHARGEABLE IN RECESSED OR FLUSH-TYPE RECEPTACLES

CROSS-REFERENCE TO RELATED COPENDING APPLICATION

This application is a continuation-in-part of copending application Ser. No. 827,694, filed Aug. 25, 1977, now abandoned.

BACKGROUND OF THE INVENTION

1. Field of the Invention

The invention relates to battery power supplies for electric devices. In particular, the invention relates to rechargeable battery packs which can be recharged in either a recessed receptacle, the receptacle being often referred to as an "outlet," or in a non-recessed receptacle and wherein the battery pack is adapted to reside within a pocket of a portable, cordless, electric device for powering the device.

2. Description of the Prior Art

The availability of rechargeable batteries has led to a variety of rechargeable, battery-operated, portable, cordless devices including grass shears, hedge trimmers, shrub trimmers, lawn mowers, sprayers, soldering irons, flashlights, screwdrivers, and the like. In some cases, the batteries are housed in a nonremovable pack while the recharging circuitry is housed in a separate charging unit. In other cases, the charging circuitry is incorporated as a part of a rechargeable battery pack. It has also been previously proposed to provide a removable battery pack having its own recharging circuitry, the pack having conventional United States-type AC prongs and arranged so that the pack can be interconnected through the prongs to the device to be powered or through the same prongs to a conventional 120 volt United States-household receptacle for recharging. U.S. Pat. Nos. 3,275,819 and 3,281,636 and French Pat. No. 1.418.746 are illustrative of such devices. It has also been suggested to have a removable, rechargeable battery pack that could be connected to any one of several battery power consuming devices.

In a recent development described in U.S. Pat. No. 3,952,239, a system now on the market is directed to a range of cordless devices including grass shears, lanterns, drills, and shrub trimmers. Each device mates with a standardized power handle which serves both as a handle and a housing for a rechargeable battery.

As described in the commonly-assigned, copending application Ser. No. 607,376, now U.S. Pat. No. 4,084,123, the most recent known development in the art of battery power packs is the advent of a relatively flat, rectangular, box-shaped battery pack which fits into a mating pocket in a device. This battery pack carries a pair of standard AC prongs extending from a flat sidewall surface of the pack. The prongs are adapted for insertion into a standard United States-type, 120 volt, AC receptacle for charging the battery pack through rectifier means contained in the pack thus eliminating the need for a separate charger. When the battery pack is positioned in the respective pocket of the tool or device, a mechanical switch is actuated by mating formations on the pack and pocket and connects the battery pack in a discharge mode so that the particular tool or device can be powered through the batteries using the same set of AC prongs. Heavy duty tools or devices are provided with multiple pockets for the reception of a corresponding number of identical battery packs.

While adapted to receptacles of the type found in the United States, the rechargeable pack described in copending application Ser. No. 607,376 does not adapt to recharging conditions as are encountered in Europe and other areas of the world where recessed-type receptacles are employed.

U.S. Pat. Nos. 3,067,373 and 3,120,632 are illustrative of combined power unit-load unit assemblies which can be easily disconnected from the load unit and connected to any readily available source of alternating current such as a conventional household receptacle. Also, these patents illustrate prongs slidably arranged in the unit assembly.

Also, U.S. Pat. No. 3,996,546 is illustrative of a dual voltage, electrical plug which is adaptable to connect an appliance, such as an electric shaver, alternatively to sockets belonging to either one of two main supplies of differing voltage, e.g., 110 volt United States or 220 volt European.

With all of the foregoing considerations in mind, it thus becomes the object of this invention to provide a type of rechargeable battery pack which improves on the foregoing prior art and is adaptable for recharging in either flush or recessed-type receptacles, whether shallow or deeply recessed.

SUMMARY OF THE INVENTION

Many of the features of the battery pack disclosed in copending application Ser. No. 607,376 are retained. More specifically, according to the present invention, there is provided a rechargeable, battery pack which may be recharged in flush or recessed-type receptacles comprising a hollow housing of a rather rectangular, flat, box-like shape and having a pair of prongs mounted on a movable plug projecting from one flat-sidewall or base surface of the pack. The prongs are adapted to be received by a corresponding set of prong-receiving openings provided in a mating base plate or liner in an outwardly-opening pocket of a tool or device for discharge purposes.

For charging purposes in the recessed-type, European 220 volt receptacle, the plug and its prongs are withdrawn from within the pack by releasing the plug which mounts the prongs and which is forced outward by a spring inside the housing. The plug is then locked in an appropriate extended position and the plug and prong unit is placed in the receptacle. In a preferred embodiment, means are provided for locking the plug in a plurality of extended positions to accommodate shallow and deeply-recessed receptacles.

For charging purposes in the flush or non-recessed-type receptacle, the plug is depressed and locked within the pack housing so that only the prongs extend from the pack. The prongs are then inserted in the receptacle for charging.

For discharging, the plug is depressed and locked within the pack housing so that only the prongs extend from the pack as when in the non-recessed or flush-type receptacle charging position. When the plug is depressed within the pack, a DC voltage and DC supply is available at the prongs for operating the tool or device but not until a switch actuator located between the prongs is depressed. This action occurs automatically when the power pack is inserted into the tool or device which is designed with a mating actuating post. This provides protection in that no voltage or power is present at the prongs except when the power pack is properly and fully inserted into the tool or device. The switching action is accomplished via a plug slide arrangement which moves up and down a printed circuit board within the power pack housing.

DESCRIPTION OF THE PREFERRED EMBODIMENT

Figure 1:
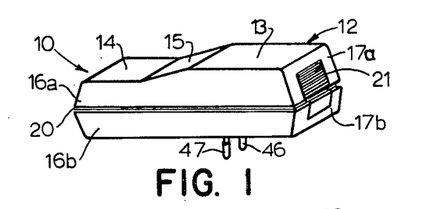
FIG. 1 is a perspective view illustrating the rechargeable battery pack of the present invention.
Figure 2:
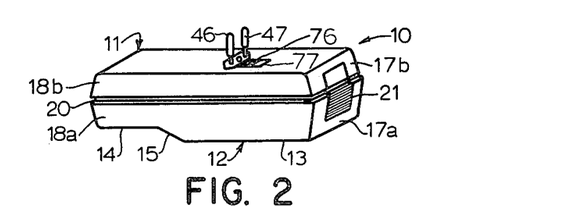
FIG. 2 is an inverted perspective view of the battery pack and showing the position of the prongs as they would be either for discharge or for charging in a flush-type receptacle.
Figure 3:
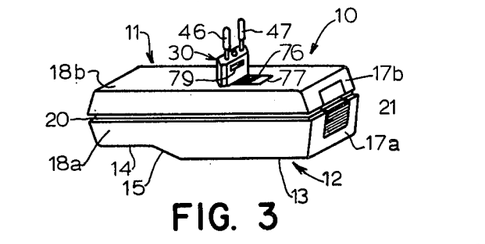
FIG. 3 is an inverted perspective view similar to that of FIG. 2 illustrating the withdrawn plug as it would appear for insertion in a deeply-recessed, European-type, 220 volt receptacle.
Figure 4:
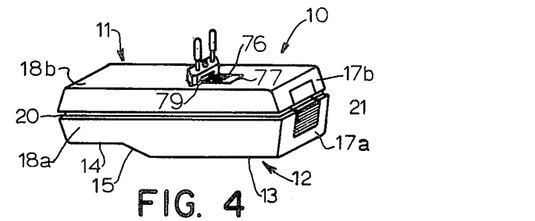
FIG. 4 is an inverted perspective view similar to that of FIG. 3 illustrating the withdrawn plug as it would appear for insertion in a European-type receptacle having a shallow recess.

Referring now to the drawings, rechargeable battery pack 10 adaptable for charging in recessed or flush-type receptacles, has a hollow housing of rather rectangular, flat, box-like shape. Pack 10 has a generally flat, bottom wall 11 and a top wall 12 having a pair of generally flat surfaces 13, 14 and an angled surface 15. The sides of pack 10 are made up of components 16a, 16b, 17a, 17b, 18a, 18b, 19a and 19b. Once bottom wall 11 and top wall 12 are assembled together to form the housing of pack 10, side components 16a through 19b form a groove 20 which encircles pack 10. Pack 10 of the present embodiment has its own latch as will be described; however, if the latch is made a part of the tool or device, housing groove 20 can be used to receive a latch and retain the pack.

Side surface components 17a, 17b are provided with a resilient latch member 21 which is adapted to engage a ledge portion of the tool pocket in order to hold the pack in place.

FIGS. 7, 8, 9 and 10 are longitudinal, section views which show the internal components of battery pack 10. Top wall 12 and bottom wall 11 are essentially a pair of secured rectangular, pan-shaped, clamshell members. The internal components, illustrated in FIGS. 7-14 and FIGS. 21-24, include rechargeable, nickel-cadmium batteries 25, 26, 27; capacitor 28; printed circuit board 29; plug 30; diode bridge 31; and resistors 32, 33. Such circuitry minimizes weight and heat with both a rectifier and rectifier bypass.

Bottom wall member 11 is approximately 2¼ inches by 4½ inches by ¾ inch, has a wall thickness of about 5/64 inch and is preferably molded of an impact-resistant, flame-retardant polycarbonate. The interior wall surfaces of bottom wall member 11 is provided with circuit board locators 35 into which circuit board 29 slides into place during assembly. A recessed area 36 is provided in sidewall surface 17b of member 11 to accommodate latch member 21. The recessed area and associated structural members will be described in conjunction with the description of latch 21. The interior surface of bottom wall member 11 is provided with battery locating ribs 37 that aid in locating batteries 25, 26, 27 during assembly and also serve to keep the batteries in position during use and thereby reduce rattling. Ribs 37 serve to provide compartments for batteries 25, 26, 27. Ribs 37 are designed to be resilient and absorb shock from the batteries when pack 10 is accidentally dropped. While absorbing shock, ribs 37 also lend strength to the overall construction of pack 10.

Top wall member 12 is approximately 2¼ inches by 4½ inches by ⅜ inch at its deepest point and approximately ⅛ inch at its shallowest point, has a wall thickness of about 5/64 inch and is preferably molded of an impact resistant, flame retardant polycarbonate. The interior wall surfaces of member 12 are provided with circuit board 29 locators into which circuit board 29 slides into place during assembly. Circuit board 29 mounts the circuitry diagrammed in FIGS. 21-24 and against which contacts 65 slide in the various operating modes. A recessed area 42 is provided in sidewall surface 17a of member 12 to mate with recessed area 36 of member 11 and which together accommodate latch member 21. The recessed area and associated structural members will be described in conjunction with the description of latch 21. The interior surface of top wall member 12 is provided with battery locating resilient, shock-absorbing ribs 43 which, in conjunction with ribs 37, aid in locating batteries 25, 26, 27 during assembly, serve to keep the batteries in position during use and also lend strength to the overall construction of pack 10. Top wall member 12 and bottom wall member 11 are snap-fitted together and are then ultrasonically welded together once all components are assembled therein.

Referring back to bottom member 11, member 11 is provided with a slot 44 shaped like plug 30 and in which plug 30 slides and through which prongs 46, 47 and plug 30 protrude. Prongs 46, 47 are maintained in a fixed position within plug 30 at all times. Internal guides 48 align and guide plug 30 in a sliding relation in slot 44. Plug 30 is molded as two hollow half-sections 30a, 30b which are held together by screw 50 passing through bosses 51, 52 and being threadably retained therein. Tabs 49 are molded integral with plug 30 and prevent plug 30 from being withdrawn from within the housing.

In addition to plug 30 itself having a sliding relation with respect to wall member 11, certain parts of the switching mechanism within plug 30 have a sliding relation to plug 30 itself and effect various switching operations. In this regard, a switch actuator 55 is slidably mounted within plug 30 and has a switch actuating post 56 and below post 56 a recess 57 molded integral therewith. Post 56 extends through a hole 58 in plug 30 and the end of post 56 resides flush with the outside of plug 30. Actuator 55 and its post 56 are held in this flush position by spring 59 which resides in recess 57 and the other end of which rests on boss 51. The force exerted by spring 59 maintains post 56 in this flush position but when post 56 is depressed, spring 59 is compressed and switch actuator 55 moves downward within plug 30. Release of the depressing force on post 56 allows spring 59 to return switch actuator 55 to its original position. Thus, it can be seen that actuator 55 can move relative to the plug itself that is relative to the plug housing sections 30a, 30b.

The outwardly extending prongs 46, 47 are held fixed in plug 30 and the intermediate portions thereof pass through switch actuator 55 in a sliding relation so that actuator 55 may slide on prongs 46, 47. The innermost ends of prongs 46, 47 are of a reduced diameter 60 and are secured in sleeves 61 which are molded integral with sections 30a and 30b respectively of plug 30. The extreme outward ends of prongs 46, 47 comprise tips which actually make contact in the tool or receptacle.

Contacts 65 are fixedly received by switch actuator 55 and slide up and down on the intermediate thickened portion of prongs 46, 47 as actuator 55 slides within plug 30. Contacts 65 extend through hole 66 in plug section 30a and extend slightly beyond the outside wall of section 30a. Contacts 65 are flexible and can move outwardly and inwardly in holes 66 as required to maintain good prong contact and function as later described with respect to circuit board 29.

The in and out movement of plug 30 within pack 10 is provided by spring 70 which is compressed when plug 30 is forced into pack 10 and which is relaxed when plug 30 is allowed to extend outwardly from pack 10. Spring 70 is maintained in a recess 71 in plug 30 by post 72 which is integral with recess 71 and plug 30. When compressed within pack 10, spring 70 rests at one end against boss 51 and at the other end against the inside of flat wall surface 13. The in and out movement of plug 30 is allowed or prevented, depending upon the position of latch 75 which is slidably retained in the inside surface of flat bottom wall 11.

Figure 15:
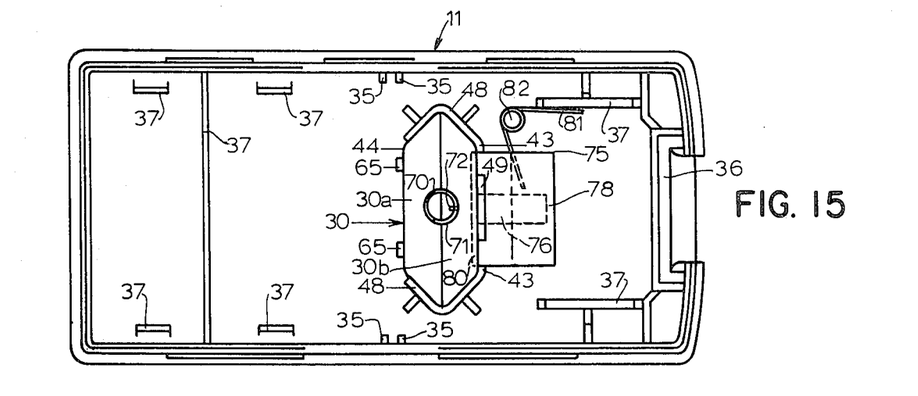
FIG. 15 is a plan view of the inside surface of the bottom wall member showing the plug, latch and return spring and with the batteries and wiring removed for purpose of illustration.

FIG. 15 shows in plan view the relationship of latch 75 with the inside surface of bottom wall 11. Latch 75 has a finger-engaging portion 76 which resides external of pack 10 and substantially flush with the outside wall of bottom wall 11. Finger portion 76 slides back and forth in opening 77 in wall 11. Finger portion 76 also has an elongated, integral internal side portion 78, one end of which is designed to engage an opening 79, 87 or 83 in side 30b of plug 30, as shown in FIGS. 7, 8, 9 and 10. End 80 of slide portion 78 engages opening 83 when plug 30 is within pack 10 and engages openings 87 or 79 when plug 30 is in a withdrawn position ready for recharging purposes. Spring 81 exerts a force against finger portion 76 and forces end 80 into opening 79, 87 or 83. Spring 81 is mounted on a post 82 molded integral with the internal surface of wall 11. A further opening 89 in side 30a of plug 30 allows for finger grip and aids in withdrawal of plug 30 from within pack 10 when latch 75 is released. Spring 70 and the aid of finger pull in opening 83, 89 withdraws plug 30 from within pack 10 and assures locking. Once released, end 80 of latch 75 is forced into opening 87 or 79 and locks plug 30 external of pack 10. When end 80 of latch 75 is forced into opening 79 plug 30 is locked in a position in which it is substantially fully extended from pack 10. On the other hand, when end 80 of latch 75 is forced into opening 87, the plug is locked in a partially extended position. It will be understood that although at least one opening below opening 83 is required to lock plug 30 in an extended position from pack 10, any number of such openings may be provided to accommodate varying levels of extension.

Figure 5:
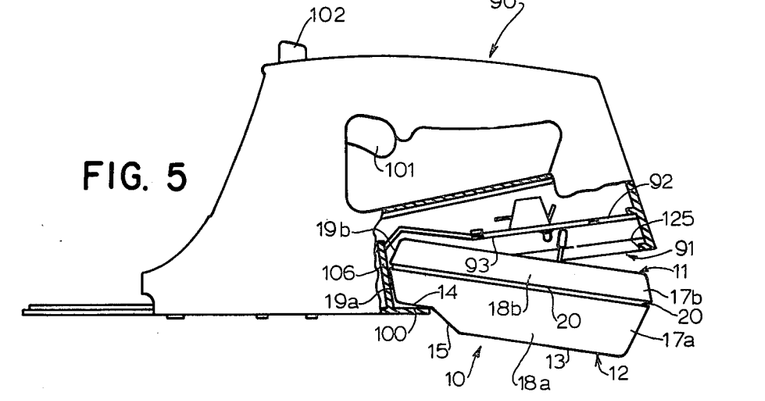
FIG. 5 is a side view of a grass shear adapted to receive the battery pack of the present invention and with a portion of the shear housing broken away to illustrate the pocket and liner and a battery pack in the partially-inserted position.
Figure 6:
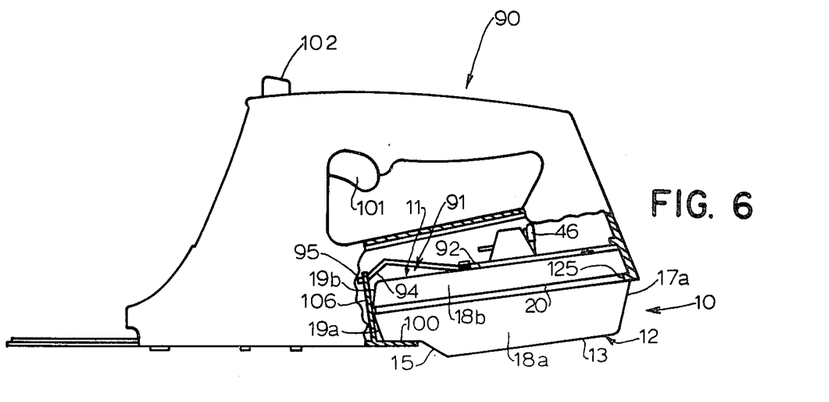
FIG. 6 is a view similar to FIG. 5 with the battery pack fully inserted into the tool.
Figure 7:
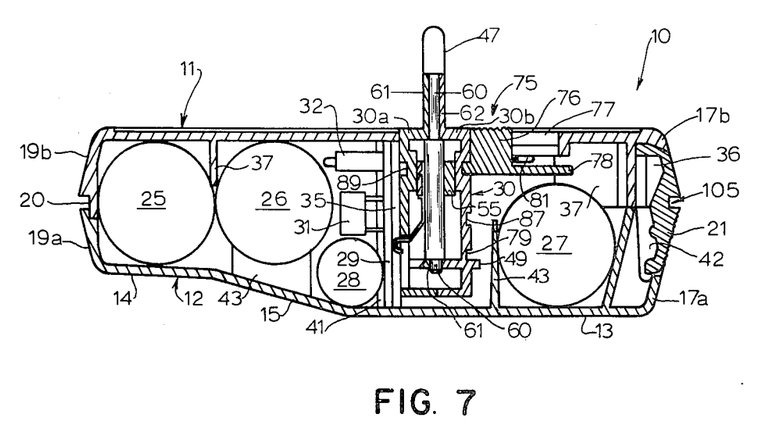
FIG. 7 is a longitudinal section of the pack showing the plug and prongs in a normal charge position for flush receptacles and with the wiring and springs removed for purposes of illustration.
Figure 8:
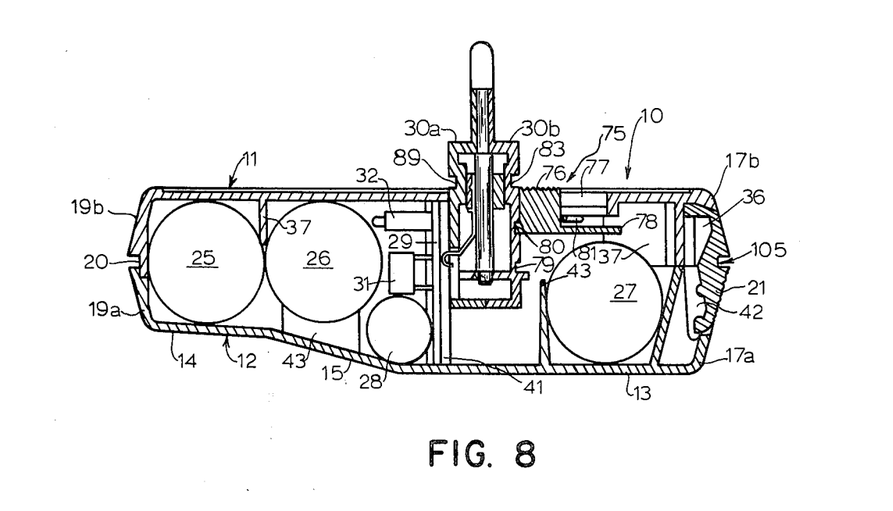
FIG. 8 is a longitudinal section of the pack showing the plug and prongs in a normal charge position for receptacles having a shallow recess and with the wiring and springs removed for purposes of illustration.
Figure 9:
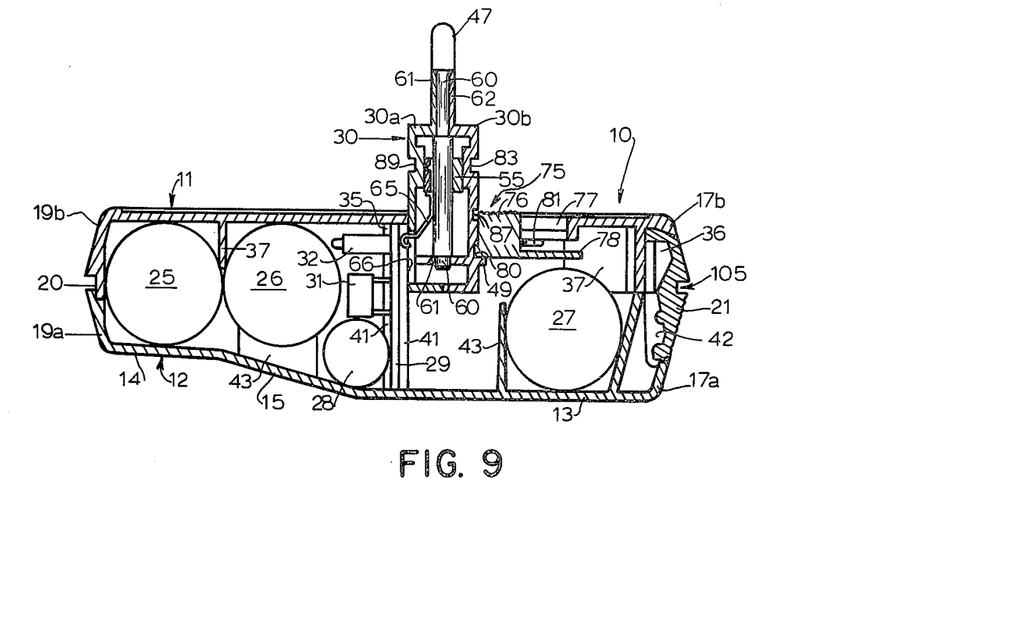
FIG. 9 is a longitudinal section of the pack showing the plug and prongs in a normal charge position for deeply recessed receptacles and with the wiring and springs removed for purposes of illustration.
Figure 10:
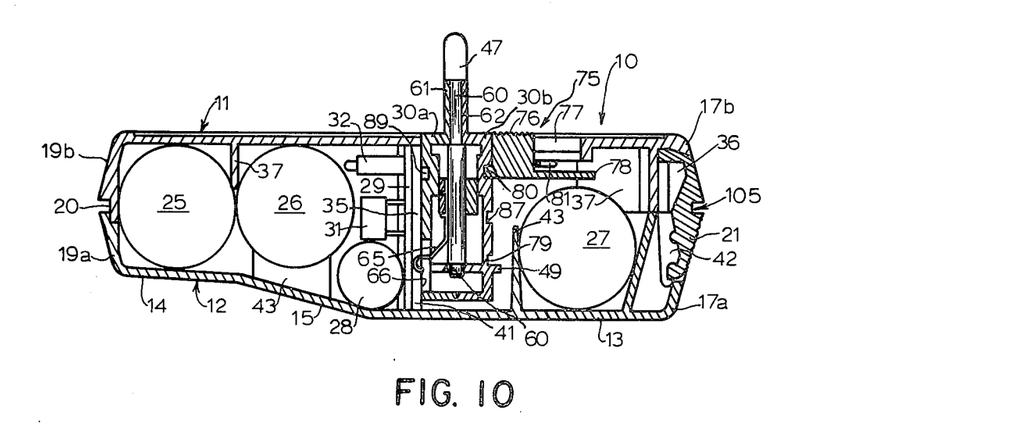
FIG. 10 is a view similar to that of FIG. 7 but illustrating the discharge mode with the actuator button depressed.
Figure 11:
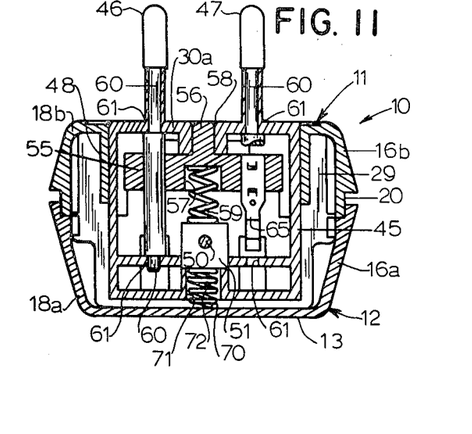
FIG. 11 is a lateral section view of the pack in the FIG. 7 position.
Figure 12:
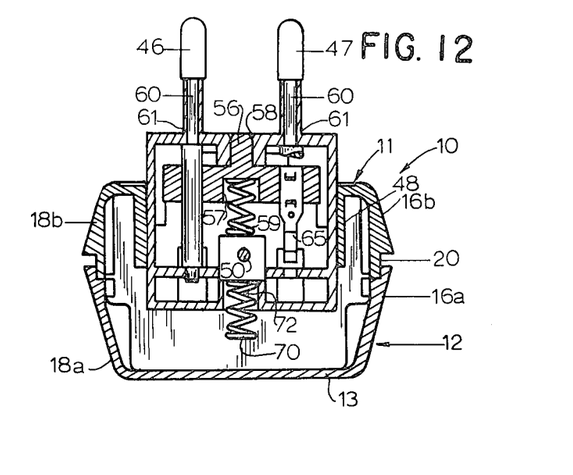
FIG. 12 is a lateral section view of the pack in the FIG. 8 position.
Figure 13:
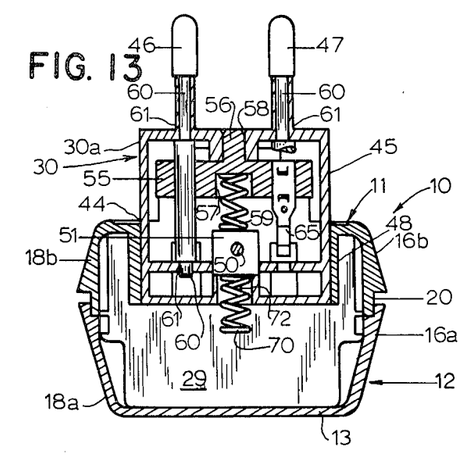
FIG. 13 is a lateral section view of the pack in the FIG. 9 position.
Figure 14:
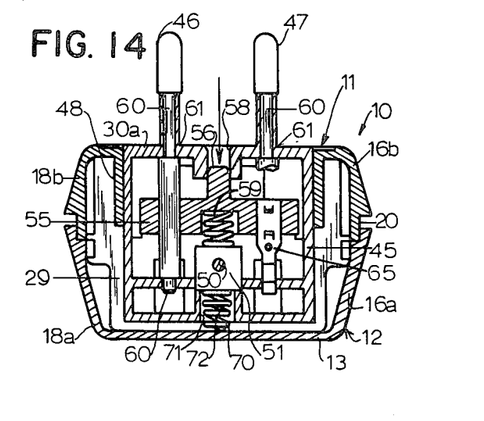
FIG. 14 is a lateral section view of the pack in the FIG. 10 position with the prongs broken to illustrate the contacts.
Figure 16:
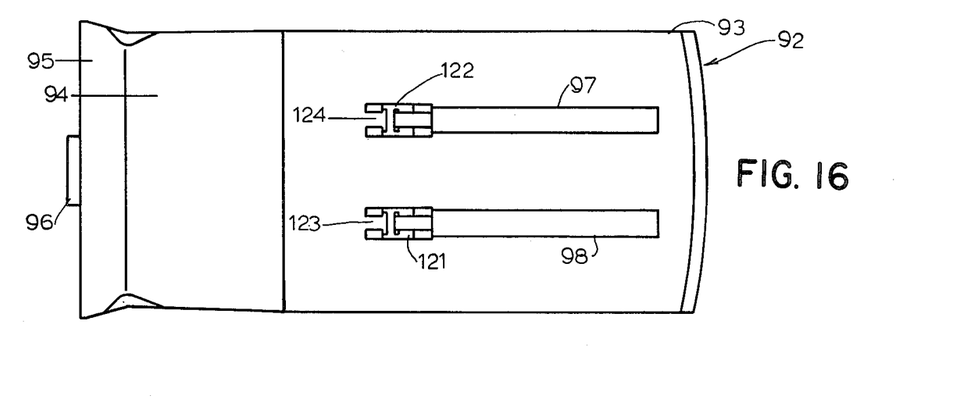
FIG. 16 is a top view of the pocket base plate or liner and showing the openings for receiving the prongs of the pack.
Figure 17:
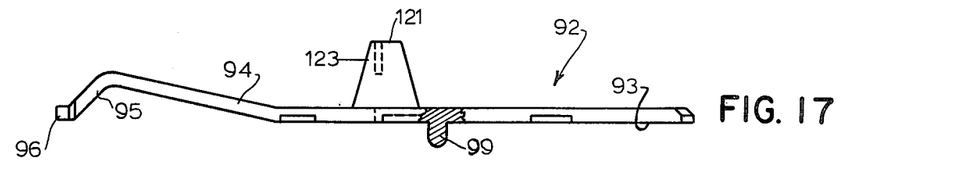
FIG. 17 is a side view of the pocket base plate or liner illustrated in FIG. 16.
Figure 18:
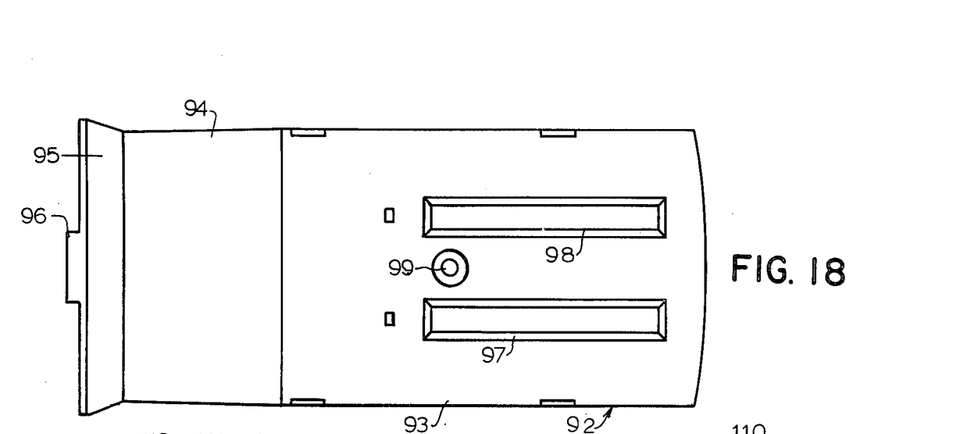
FIG. 18 is a bottom view of the liner of FIGS. 16 and 17.

FIGS. 5 and 6 illustrate pack 10 being inserted and, when inserted, ready for discharge and powering of the tool. In order for pack 10 to be inserted in the tool, shear 90 has a pocket 91 and liner 92, which is a common component of any tool or device in which pack 10 is used. Liner 92 serves as a base wall in pocket 91 and includes a flat surface 93, an inclined surface 94, a lip portion 95, and an extension 96 as seen in FIGS. 16-18. Flat surface 93 is adapted to engage the flat inner wall surface of battery pack 10 when pack 10 is inserted into pocket 91. Surfaces 94 and 95 are adapted to facilitate the pivotal insertion and removal of pack 10, as later described. Surface 93 provides two prong receiving slots 97, 98. Such pocket is described in copending application 607, 376.

Figure 19:
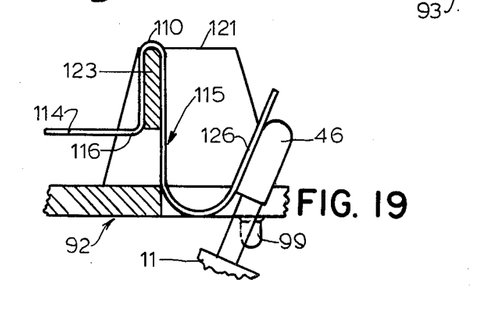
FIG. 19 is an enlarged, fragmentary view of the spring contact member as it is initially engaged by the prong of the battery pack during insertion of the pack into the pocket.
Figure 20:
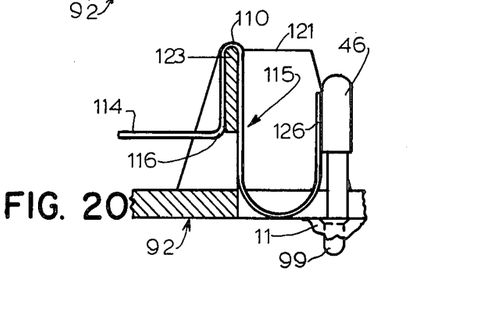
FIG. 20 is a view similar to FIG. 19 showing the prongs fully inserted and ready for discharge to operate the shear.

The circuitry as illustrated in the accompanying drawings, provides for the internal battery pack to be connected to the prongs for recharging in three positions: (a) when plug 30 is withdrawn from pack 10 for deeply-recessed receptacles as in FIGS. 3, 9, 13 and 23; (b) when plug 30 is partially withdrawn from pack 10 for receptacles having a shallow recess as in FIGS. 4, 8, 12 and 22; and (c) when plug 30 is within pack 10 for flush receptacles as in FIGS. 2, 7, 11 and 21. However, as previously explained, the battery pack and device housing pocket are also provided with means to switch the internal battery pack circuitry to connect the prongs to the battery for discharge and use as a power source when plug 30 is within pack 10 and pack 10 is inserted in pocket 91 as in FIGS. 6, 10, 14 and 24. In this regard, it may be noted that liner post 99 is located on the wall of liner 92 against which pack 10 resides when in pocket 91. When pack 10 is fully inserted into pocket 91, with plug 30 within pack 10, pack prongs 46, 47 enter the prong-receiving slots 97, 98 and post 99 engages switch actuating post 56 so as to switch the circuitry of pack 10 into discharging mode as in FIG. 24. Contact spring holders 121, 122 (FIGS. 16, 19, 20) provide in a central portion thereof post members 123, 124 which are each adapted to receive a contact spring 115 as best shown in FIGS. 19 and 20. Contact springs 115 contact the inserted prongs 46, 47 and comprise curved leaf springs of resilient conductive metal having a loop portion 110, an elbow portion 116, a U-shaped prong engagement portion 126, and a wire lead solder contact 114 (FIGS. 19, 20). Loop 110 and elbow 116 are press-fitted over one of the grooved post members 123, 124 and hold contact spring 115 in place. Prong engagement portion 126 is normally in the external position shown in FIG. 19. As pack 10 is pivoted into pocket 91, one of prongs 46, 47 contacts spring 115 and bends it until pack 10 is fully inserted as in FIG. 20. Springs 115 are, thus, adapted to provide exceptionally reliable electrical contact with the leading edges of prongs 46, 47. Wire lead solder contact 114 of contact spring 115 is adapted to electrically connect spring 115 to the appropriate wire leads of the tool motor or other device apparatus.

The method of insertion and removal of pack 10 into and from pocket 91 is best illustrated in FIGS. 5 and 6 with respect to a typical grass shear adapted with a single pocket and battery pack according to the invention. The shear 90 is held by one hand with the pocket 91 facing downwardly. With the other hand, the operator picks up pack 10 with prongs 46, 47 facing upwardly and with plug 30 within pack 10. The end of pack 10 opposite latch 21 is then inserted into pocket 91 with surface 14 of pack 10 resting on pocket ledge 100 and with generally flat bottom wall surface 11 of pack 10 residing proximate incline surface 94. Pack 10 is now rocked about ledge 100 until the generally flat bottom wall surface 11 of pack 10 lies flush against flat surface 93 of liner 92 (FIG. 6). During this rocking movement, prongs 46, 47 enter slots 97, 98 until prongs 46, 47 engage and bend contact springs 115. Also, during this rocking motion, liner post 99 engages switch actuating post 56. When pack 10 is fully inserted, pocket lip 125 engages latch groove 105 in order to hold pack 10 in place without requiring guideways, or the like. Thus, the front receptacle portion of the pocket formed by the portions 94, 95 of liner 92, housing wall 106, and ledge 100 locates pack 10 for insertion, supports pack 10 during the rocking movement and holds the forward end of pack 10 securely in place.

It should be noted that the internal spring 59 for switch actuator 55 and the pair of contact springs 115 (FIG. 19) are all compressed by latching of pack 10. Thus, pack 10 tends to tilt and pop out when unlatched. The removal of pack 10 from pocket 91 becomes a two-step operation which provides a degree of protection against accidental unlatching or dropping of pack 10. First, latch 21 is depressed so that latch groove 105 disengages pocket lip 125 and by the mentioned spring action and possible force of gravity, dependent on how the tool or device is positioned, pack 10 moves to and is held in a partially removed position as illustrated by FIG. 5. Thus, if latch 21 is accidentally depressed, pack 10 can move to the partially removed position and remain there until reinserted or removed. In the embodiment illustrated, it is recognized that in shear 90, the operator trigger or other type on-off switch 101 and safety 102 is suitably placed for operator control as shown in FIGS. 5 and 6.

The charging and discharging circuitry of pack 10 will now be described with reference to the schematic circuit diagrams of FIGS. 21, 22, 23 and 24. FIG. 23 illustrates schematically the charging circuitry of pack 10 for charging in a deeply-recessed receptacle. With plug 30 withdrawn from pack 10, pack 10 is ready for charging through a conventional European-type, deeply recessed, 220 volt receptacle. Contacts 65 are movable with switch actuator 55. The charging circuitry of FIG. 23 comprises: (1) prongs 46, 47; (2) contacts 65; (3) charging contact terminals 141, 142; (4) a capacitor 28 which is adapted to drop the input voltage; (5) a diode bridge full wave rectifier 31; (6) batteries 25, 26, 27 connected in series; (7) a bleed resistor 32 which is selected to quickly bleed by completing a RC circuit with a short time constant; and (8) a surge resistor 33 which prevents the diode bridge 31 from receiving a large surge when capacitor 28 is completely discharged.

Figure 22:
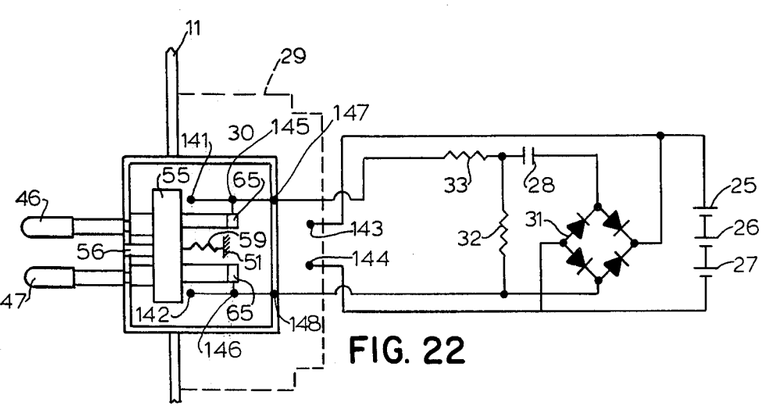
FIG. 22 is a schematic circuit diagram of the pack ready for charging in a receptacle of the type having a shallow recess.
Figure 23:
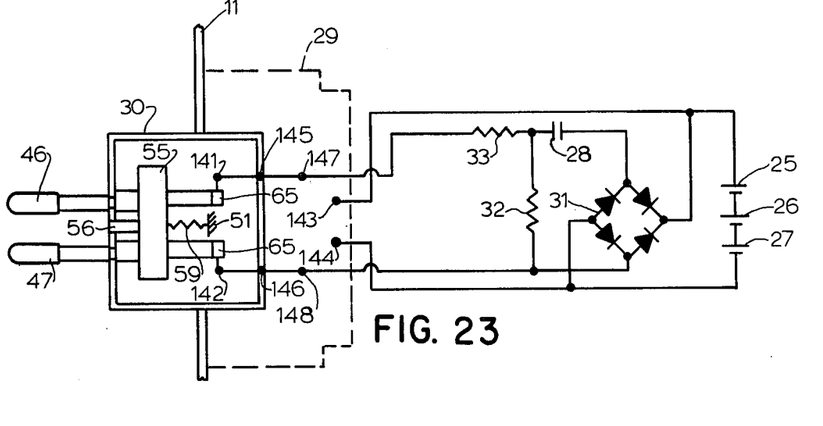
FIG. 23 is a schematic circuit diagram of the charging circuitry of the battery pack for use with a 220 volt European receptacle of the deeply-recessed-type.

FIG. 22 illustrates a schematic circuit diagram of pack 10 for charging in a receptacle having a relatively shallow recess. Plug 30 is partially withdrawn from pack 10 to an intermediate position of extension. With plug 30 in this position, the prong contacts 65 are brought into electrical connection with charging contact terminals 145 and 146.

Figure 21:
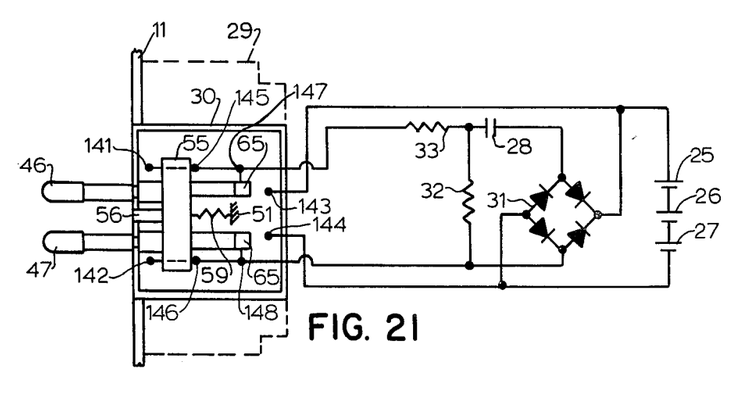
FIG. 21 is a schematic circuit diagram of the pack ready for charging in a flush-type receptacle.

FIG. 21 illustrates a schematic circuit diagram of pack 10 ready for charging with plug 30 in a retracted position and which is useful for flush-type receptacles. With plug 30 in this position, the prong contacts 65 are brought into electrical connection with charging contact terminals 147 and 148.

Figure 24:
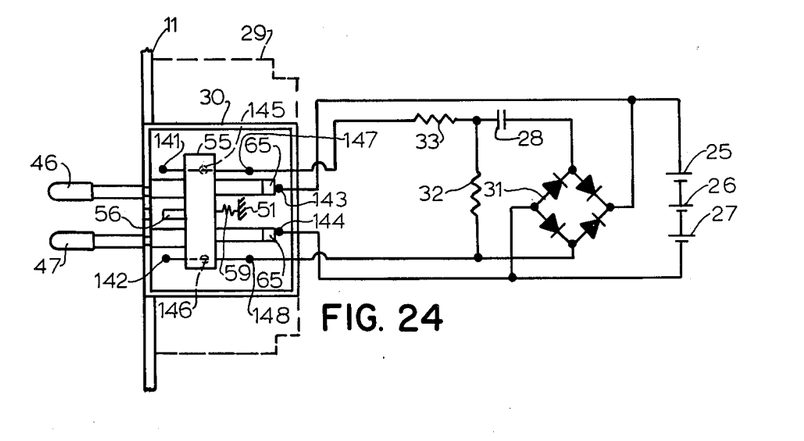
FIG. 24 is a schematic circuit diagram of the discharging circuitry of the battery pack with the actuator button depressed.
Figure 25:
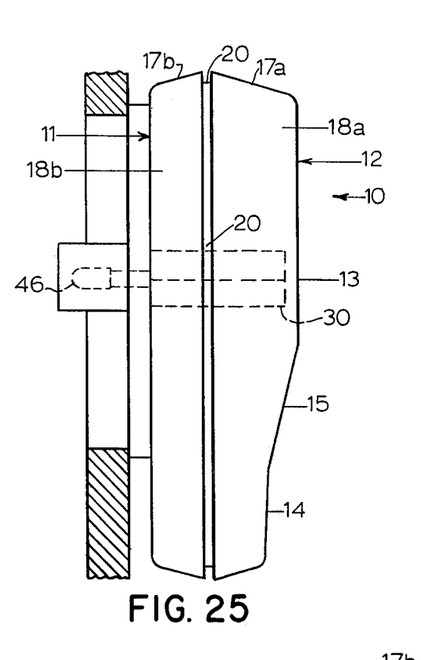
FIG. 25 is a side view of the battery pack as it is inserted into a flush or non-recessed type receptacle.
Figure 26:
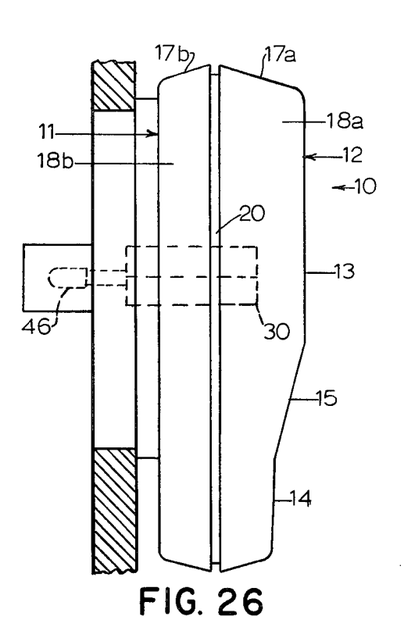
FIG. 26 is a side view of the battery pack as it is inserted into a receptacle having a shallow recess.
Figure 27:
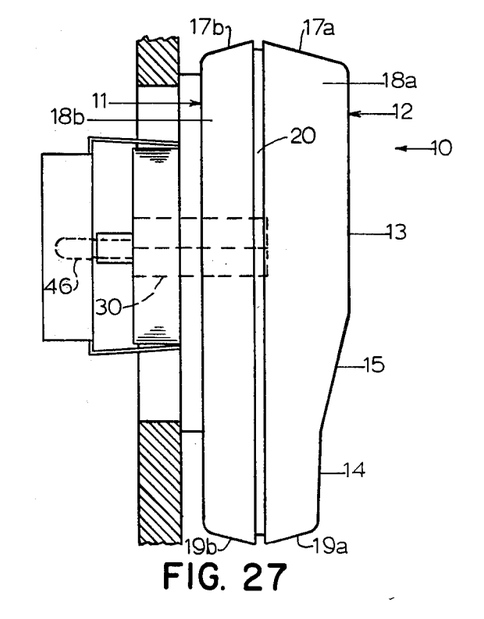
FIG. 27 is a side view of the battery pack as it is inserted into a deeply-recessed receptacle.

FIG. 24 illustrates the discharge circuitry of pack 10. The discharge circuitry is, of course, a direct connection between: (1) prongs 46, 47; (2) contacts 65; (3) terminals 143, 144; and (4) batteries 25, 26, 27. Once plug 30 is moved into a locked position within pack 10, pack 10 can now be placed in a shear 90 for powering the device. Liner post 99 contacts switch-actuating post 56 and forces switch actuator 55 and contacts 65 inward in plug 30 so that contacts 65 now contact discharge contact terminals 143, 144. The discharge circuitry is now actuated. Removal of pack 10 from shear 90 releases the force upon post 56 and spring 59 moves actuator 55 back to its FIG. 21 charge position for flush-type receptacles.

The described pack circuitry has several practical advantages in that such full wave rectification circuitry minimizes both weight and internal heat. Pack 10 can essentially be encapsulated, though hole 58 is preferably designed to provide sufficient clearance, both for post 56 and to vent pack 10 in the event of extraneous battery gases. In contrast, recharging circuitry of other types, e.g., half-wave rectification, would both increase weight and temperature and require positive venting. Those skilled in the art will recognize that the circuitry can be readily adapted for charging when plug 30 is withdrawn from pack 10 to positions other than those which have been illustrated.

In summary, it can be seen that pack 10 of the present invention, thus, provides both a unique battery pack suited for recharging from various type receptacles as well as a unique battery pack-tool pocket combination which is economical to mass produce. It will also be seen that the several advantages of the universal-type power pack and pocket arrangement previously described in copending application Ser. No. 607,376 have been retained while adapting such type of pack and pocket arrangement for use in Europe and other parts of the world where electrical outlet design differs from that found in the United States.

What is claimed is:

1. A battery pack for mounting in a portable device to be powered thereby and adapted for recharging in either a recessed or non-recessed receptacle, said battery pack comprising:
   (a) an elongated substantially rectangular housing having at least one substantially rectangular flat base wall with a plug receiving opening and said walls, the area of the base wall being greater than the area of any of the side walls;
   (b) battery means in said housing;
   (c) a rectifier in said housing;
   (d) a prong-mounting plug having a cavity formed therein and slidably mounted in said base wall opening and having a pair of external contact prongs fixed on and extending therefrom and oriented perpendicular to said base wall, said slidable plug being positionable in at least one outwardly extending position from said base wall wherein said plug and prongs are both extended and adapted for insertion into a recessed receptacle for recharging said pack and positionable to a retracted position wherein said plug retracts into said housing inwardly of the plane of said base wall and said prongs extend outwardly from said base wall for insertion into a non-recessed receptacle or into a device having mating prong recesses for recharging said pack or powering said device as the case may be;
   (e) circuit means including cooperative sliding contact means including on one side sliding contacts fixed on and movable with said plug and on the other side contacts engaged by said sliding contacts within the housing and being effective to connect said prongs to said battery means through said rectifier in any of said plug positions enabling said battery means to be recharged from either said type receptacle;
   (f) switching means having on one side contacts fixed within said housing and connected to said battery means and having on the other side contacts fixed within said plug cavity and connected to said prongs and slidable connecting and actuator means mounted within said plug cavity and movable relative to said plug for bridging said fixed housing and plug cavity contacts and spring-biased by means within said plug cavity to maintain said fixed housing and plug cavity contacts disconnected when the pack is not mounted in the device and adapted to being actuated by means on the device operative on said actuator means to connect the battery means through said fixed housing and plug cavity contacts and connecting means to discharge through the external contact prongs upon mounting the pack in said device and with said plug in said retracted position; and
   (g) releasable latching means mounted on said base wall and cooperative with said plug enabling said plug to be releasably secured in any of said positions.

2. A pack as claimed in claim 1 including additional releasable latch means mounted on one end of said pack housing enabling said pack housing to be releasably secured in a mating recess of said device.

3. A pack as claimed in claim 1 including additional spring biasing means mounted within said pack housing and operative when said plug is in said retracted position to bias said plug for movement towards an extended position.

4. A pack as claimed in claim 3 wherein said additional spring biasing means comprises a coil spring secured to an inner surface of said plug and adapted for engaging an internal wall surface of said housing opposite said base wall as said plug moves to said retracted position.

5. A pack as claimed in claim 1 wherein said opening is located such that said plug is slidably mounted at a position intermediate the length of said base wall.

6. A pack as claimed in claim 1 including additional releasable latching means mounted on one end of said pack housing enabling said pack housing to be releasably secured in a mating recess of said device, additional spring-biasing means mounted within said pack housing and operative when said plug is in said retracted position to bias said plug for movement towards a said extended position, and wherein said plug is slidably mounted at a position intermediate the length of said base wall.

7. A pack as claimed in claim 1, said prong-mounting plug being positionable in a first and second outwardly extending position from said base wall and when in said first position said plug and prongs being adapted for insertion into a deeply recessed type receptacle for recharging said pack, and when in said second position said plug and prongs being adapted for insertion into a shallow recessed receptacle for recharging said pack.

8. A battery pack adapted for being mounted in a portable device to be powered thereby and for being recharged in either a recessed or non-recessed receptacle, said battery pack comprising:
   (a) an elongated housing having at least one substantially rectangular flat base wall and side walls;
   (b) battery means in said housing;
   (c) a rectifier in said housing;
   (d) a prong-mounting plug having a cavity formed therein and slidably mounted in said base wall and having a pair of external contact prongs fixed on and extending therefrom and oriented perpendicular to said base wall, said slidable plug being positionable in at least one outwardly extending position from said base wall wherein said plug and prongs are both extended and are adapted for insertion into a recessed receptacle for recharging said pack and in a retracted position wherein said plug retracts into said housing inwardly of the plane of said base wall and said prongs extend outwardly from said base wall;

(e) positionable circuit means enabling said prongs to be connected to said battery means through said rectifier in any of said plug positions such that said battery means may be recharged from either said type receptacle; and (f) switching means having on one side contacts connected to said battery means and on the other side contacts within said plug cavity and connected to said prongs and positionable means within said plug cavity for bridging said contacts and operative to maintain said contacts disconnected when the pack is not mounted in the device and adapted when the pack is mounted in the device to being actuated by means on the device to connect said contacts within said plug cavity enabling said battery means to discharge through the prongs and with the plug in the retracted position.

* * * * *

UNITED STATES PATENT AND TRADEMARK OFFICE
CERTIFICATE OF CORRECTION

PATENT NO. : 4,191,917
DATED : March 4, 1980
INVENTOR(S) : Wayne R. Brown, John E. Jones, & Charles F. Sherrill It is certified that error appears in the above—identified patent and that said Letters Patent is hereby corrected as shown below:

Col. 2, line 37, "flat-sidewall" should be --flat sidewall--.

Col. 9, line 30, "said" should be --side--.

Signed and Sealed this

Twelfth Day of August 1980

[SEAL]

Attest:

SIDNEY A. DIAMOND

Attesting Officer

Commissioner of Patents and Trademarks